United States Patent [19]

Coucoulas et al.

[11] 4,350,513
[45] Sep. 21, 1982

[54] METHOD AND APPARATUS FOR EXTRUDING GLASS TUBES

[75] Inventors: Alexander Coucoulas, Bridgewater Township, Somerset County; Carroll D. Spainhour, Princeton Township, Mercer County, both of N.J.

[73] Assignee: Western Electric Company, Inc., New York, N.Y.

[21] Appl. No.: 324,336

[22] Filed: Nov. 23, 1981

[51] Int. Cl.³ .............................................. C03B 15/14
[52] U.S. Cl. ......................................... 65/29; 65/86; 65/108; 65/110; 65/164; 65/187
[58] Field of Search ...................... 65/29, 86, 108, 110, 65/164, 187

[56] References Cited

U.S. PATENT DOCUMENTS

| 2,893,847 | 7/1959 | Schweickert et al. | |
| 3,607,184 | 9/1971 | Williams | 65/86 X |
| 3,876,877 | 4/1975 | Wilhelmus et al. | 250/222 R |
| 3,935,059 | 1/1976 | Ayel | 156/620 |
| 4,118,212 | 10/1978 | Aulich et al. | 65/13 |
| 4,195,982 | 4/1980 | Coucoulas et al. | 65/134 |
| 4,217,027 | 8/1980 | MacChesney et al. | 350/96.3 |

OTHER PUBLICATIONS

"Extrusion of Fused Silica Cladding Tubes", Coucoulas, Technical Digest of the Third International Conference on Integrated Optics and Optical Fiber Communication, p. 112, Apr. 1981.

Primary Examiner—Robert L. Lindsay, Jr.
Attorney, Agent, or Firm—D. J. Kirk

[57] ABSTRACT

A glass tube extrusion apparatus (50) is comprised of a chamber (52) having a crucible (72) therein mounted within and spaced from an inductive heating coil (77). As a glass tube (170) is extruded from an annular opening (74) in the bottom of the crucible (72) the tube is monitored for bending. When a bend starts to occur an X-Y motion apparatus (54) is activated to move the crucible (72) laterally within the coil (77) in a direction opposite to the bend to straighten the tube (170).

5 Claims, 4 Drawing Figures

METHOD AND APPARATUS FOR EXTRUDING GLASS TUBES

TECHNICAL FIELD

The instant invention relates to a technique for extruding articles. In particular, the invention is directed to a method and apparatus for extruding hollow glass tubes.

BACKGROUND OF THE INVENTION

One technique that is well known for fabricating preforms from which lightguide fibers are drawn is known as the Modified Chemical Vapor Deposition (MCVD) process and is described in detail in U.S. Pat. No. 4,217,027. In that process, the fabrication of a lightguide preform starts with a chemically cleaned, elongated fused quartz tube which is rotated in a glass lathe. A surface mixing oxy-hydrogen torch repeatedly moves along the length of the tube in one direction resulting in a hot zone moving therealong. Chemical vapors are directed into the rotating tube as the torch traverses its length, resulting in the deposition of a plurality of layers of fused, doped silica on the inside of the tube. The tube is then heated to an elevated temperature to collapse the tube with the layers therein resulting in a solid lightguide preform wherein the original glass tube becomes the cladding and the deposited layers form the core.

Most important to such a preform fabrication process is a highly concentric glass tube with minimum variation along its length. These are among the tube properties required to make them compatible with subsequent process steps and end product requirements. Drawing processes are commonly used to fabricate these tubes where their final shape is formed in free space under the guidance of drawing parameters.

It has been shown in an article titled "Extrusion of Fused Silica Cladding Tubes" by A. Coucoulas, in the *TECHNICAL DIGEST* of the Third International Conference on Integrated Optics and Optical Fiber Communication, page 112, April 1981 that extrusion techniques provide greater dimensional control of the tube than drawing processes. For extrusion makes use of an accurately machined die to control the final shape of the issuing extrudate. That article further describes a method and apparatus for fabricating fused silica tubes using a gas pressure head. The glass tube extruder therein described is comprised of an enclosed chamber having a crucible with a die therein which forms an annular opening in the bottom of the chamber, heating coils mounted about the lower portion of the crucible and means for applying a gas pressure within the chamber. A charge of silica glass is placed in the crucible and the coils are activated to heat the charge to a lower viscosity. A gas pressure is then applied to urge the glass extrudate through the annular opening as a tube.

Such a technique has been found to be most effective in extruding high quality glass tubes. However, some tubes have been found to be unacceptable based upon the stringent requirements placed on lightguide preform starting tubes which require that any tube of four feet in length having a bow with an arc height greater than one-eighth of an inch is rejected.

It has been found that during an extrusion run, the tube, at times, will bend or bow as it exits the annulus resulting in the rejection thereof. It appears that such bending is probably due to assymmetry in the temperature and/or the radial assymmetry of the annulus itself. However, it is most difficult to achieve a uniform temperature distribution about the annulus when using an inductive heating arrangement. Additionally, it is most expensive to fabricate extremely accurately dimensioned dies to provide the desired geometric symmetry.

A further problem associated with glass tube extrusion occurs near the end of the process as the desired length of the tube has been extruded. Usually of residue of solidified glass remains on the bottom portion of the crucible as the location of the inductive heating coils does not sufficiently heat that portion. Such solidified glass is most difficult to remove and can, at times, crack the crucible upon cooling.

Accordingly, there is a need to provide a technique for simply and effectively eliminating bowing of a tube during the extrusion process and for also eliminating the problem of the solidified glass residue.

SUMMARY OF THE INVENTION

The instant invention overcomes the foregoing problem of eliminating the bow in a tube that is extruded from a glass melt in a crucible which is raised to an elevated temperature by heating means surrounding and spaced from said crucible. The method comprises the steps of monitoring the extruded tube exiting the crucible and moving the crucible relative to the heating means, in the direction of any bend, to straighten the tube within predetermined limits.

Additionally, the instant invention provides a method for removing a glass residue from a crucible, having an opening in the bottom portion thereof, the crucible being mounted within a heating coil. The method comprises the step of altering the relative vertical position of the crucible to the heating coil to cause said residue to flow and draining said residue through said opening.

DETAILED DESCRIPTION

Figure 1:
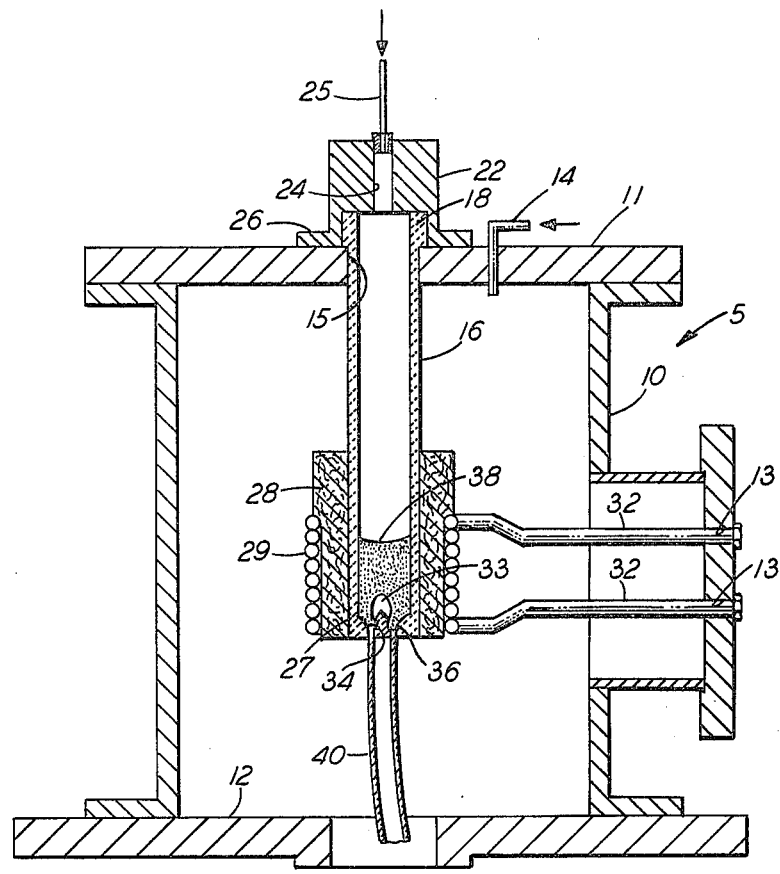
FIG. 1 is a cross-sectional view of a prior art glass extrusion apparatus.

FIG. 1 depicts a prior art gas head extrusion apparatus, generally referred to by the numeral 5. The apparatus 5 is comprised of a protective chamber 10 having top and bottom members 11 and 12, respectively. The chamber 10 has power port apertures 13—13 therein and the top member 11 has a gas port 14 and an opening 15 located in the central portion thereof. A cylindrical crucible 16 passes through the opening 15 and extends downwardly, into the central portion of the chamber 10.

A first end 18 of the crucible 16 is threadably connected to a crucible cover 22 which has a channel 24 therethrough which communicates with a gas pressure source (not shown) via tubing 25. The crucible cover 22 has an outwardly extending lip 26 which is bolted to the top member 11. The distal end 27 of the crucible 16 is encompassed by insulation 28 which is surrounded by an induction coil 29 having leads 32—32 which pass through the power port apertures 13—13 and are connected to a power supply (not shown). A mandrel 33 is positioned in an opening 34 in the bottom of the crucible 16 to form an annular opening 36 therein. One such mandrel 33 is shown in detail in U.S. Pat. No. 4,195,982 which issued on Apr. 1, 1980, assigned to the instant assignee and is hereby incorporated by reference herein.

In operation, a charge of glass, either a solid bar or particulate, is placed in the crucible 16 and the cover 22 is fastened in place. The coil 29 is activated to inductively heat the crucible 16 and the glass therein to form a flowable glass melt 38. A gas pressure is applied via the tube 25 and the channel 24 to urge the melt 32 through the annular opening 36 to extrude a glass tube 40. An inert gas such as argon or helium is directed into the chamber 10 via the gas port 14 to prevent oxidation of the crucible 16.

As hereinbefore indicated it is most difficult to uniformly heat the area in and around the annular opening 36 and the annular opening itself may not be accurately machined. Thus, the extruded tube 40 has a tendency to bend upon exiting the annular opening 36 due to such variations. Such a bend is shown in FIG. 1 and is exaggerated for purposes of clarity of exposition. Such bending can result in the fully extruded tube 40 having a bow that exceeds acceptable limits as hereinbefore set forth.

Figure 2:
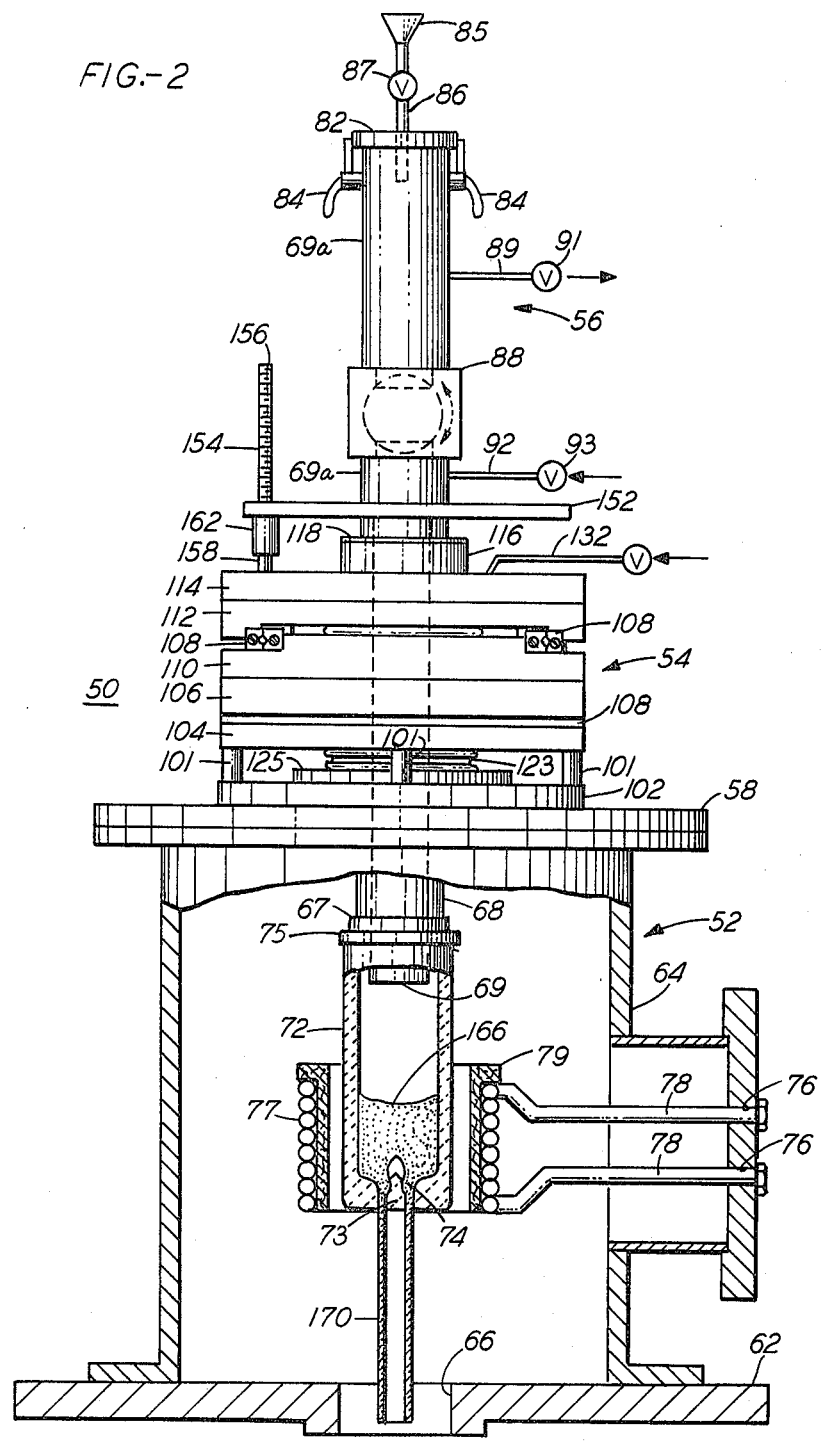
FIG. 2 is a schematic drawing of the instant glass tube extrusion apparatus.

The instant extrusion apparatus, generally referred to by the numeral 50, shown in the partial cross-sectional view in FIG. 2 overcomes the foregoing problems. The apparatus 50 is comprised of a chamber 52, an X-Y motion apparatus 54 and a feed mechanism 56. The chamber 52 has a top portion 58, a bottom portion 62 and a sidewall 64. The bottom portion 62 has a central opening 66 therein and a first end 67 of a cylindrical pipe 68, having a feed tube 69 therein, extends into the central portion of the chamber 52. A cylindrical crucible 72 made of molybdenum, having a mandrel 73 in the bottom portion thereof which forms an annular opening 74 therein, is threadably connected to an end cap 75 fixedly connected to the first end 67 of the pipe 68. The chamber 52 has power port apertures 76—76, and an induction coil 77 with leads 78—78 which are substantially the same as set forth in FIG. 1. An insulator sleeve 79, made of porous zirconia or carbon, is placed within and is supported by the coil 77 and has its inner surface spaced from the outer surface of the crucible 72 to permit lateral movement of the crucible therein.

The cylindrical pipe 68 and the tube 69 therein extend upward through the top portion 58 of the chamber 52 and the X-Y motion apparatus 54 (see FIG. 4) where the pipe 68 ends and the tube 69 expands to a larger diameter input tube 69a. The tube 69a terminates in an end cap 82 which is held in place by a clamping mechanism 84. A hopper 85 has a particulate supply tube 86, having a valve 87 therein, depending therefrom which passes through the end cap 82 and communicates with the bore of the feed tube 69. A ball valve 88 is located within the supply tube 69a and a line 89, having a valve 91 therein, connects the bore of the supply tube to a vacuum source (not shown). A pressure line 92 having a valve 93 therein is located below the ball valve 88 and is connected to a pressurized gas source (not shown).

Figure 3:
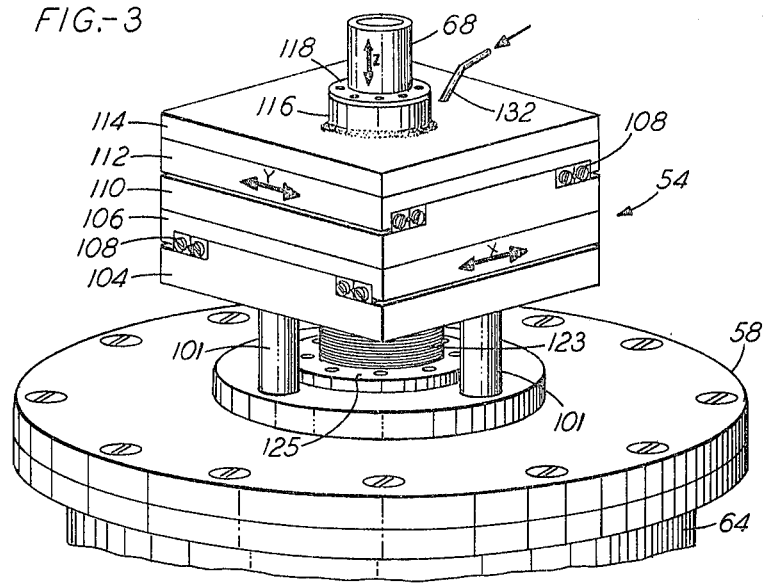
FIG. 3 is an isometric view of an X-Y motion apparatus used to implement the instant invention.
Figure 4:
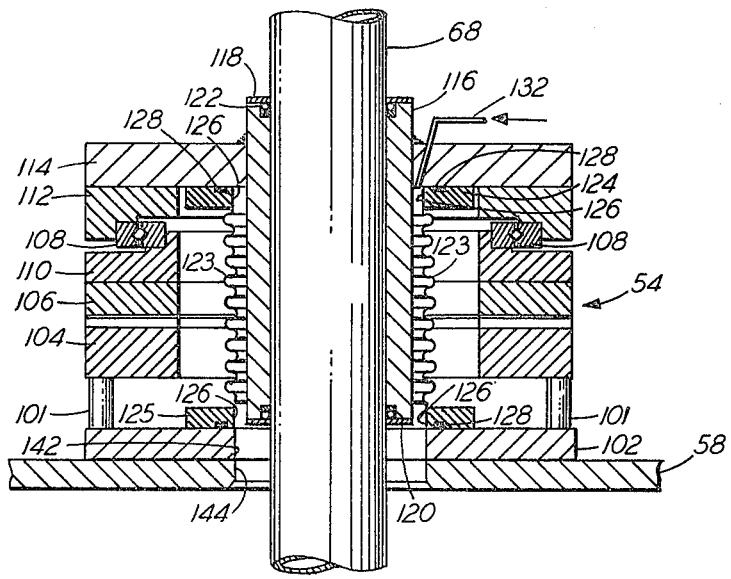
FIG. 4 is a cross-sectional view of the X-Y motion apparatus shown in FIG. 3.

The X-Y motion apparatus 54, shown in detail in FIGS. 3 and 4, is supported by a plurality of columns 101—101 which project vertically from a baseplate 102 which is fixedly mounted on the top portion 58 of the chamber 52. The apparatus 54 is comprised of a lower member 104 supported by, and fixedly attached to, the columns 101—101. A first plate 106 is moveable in the "X" plane on a plurality of bearings and ways 108—108 fixedly mounted on the lower member 104. In an exemplary embodiment the bearings and ways 108—108 were of the crossed-roller type manufactured by Micro Slides, Inc., Westbury, N.Y.

An intermediate member 110 is fixedly positioned on the top surface of the first moveable plate 106 and has a plurality of bearings and ways 108—108 on the upper portion thereof. A second plate 112 is also slideably mounted on bearings and ways 108—108, for movement in the "Y" direction. A top plate 114, securably fastened to the upper surface of the second plate 112, is welded to a large diameter tubular member 116.

As can best be seen in FIG. 4, the large diameter tubular member 116 passes through the central portion of the X-Y motion apparatus 54. The member 116 has top and bottom annular end caps 118 and 120, respectively, thereon and seals 122—122 therein which permits vertical movement of the pipe 68 within the apparatus 54. A bellows 123, surrounding the tubular member 116, extends between, and is sealably fastened to, first and second flanges 124 and 125, respectively, each having an annular sealing members 128—128 therein. The flanges 124 and 125 each have a central opening 126 therein and the surfaces of the openings are spaced from the tubular member 116. A gas supply tube 132 passes through the top plate 114 and communicates with the volume between the bellows 123 and the tubular member 116. The baseplate 102 and the top portion 58 of the chamber 52 have aligned openings 142 and 144 therein through which the pipe 68 (shown in phantom in FIG. 4) passes in spaced relation to the surface of the openings.

Additionally, as shown in FIG. 2, the cylindrical pipe 68 passes through the central portion of a plate 152 and is fixedly attached thereto. A plurality of spaced threaded rods 154—154 (only one shown) each have a first end 156 and pass through the plate 152 and a second end 158 is in contact with the top plate 114. A moveable cylinder 162 is mounted for movement along the threaded rod 156.

In operation (see FIG. 2), the valves 88, 91 and 93 are closed and the valve 87 is opened and a charge of particulate glass is introduced into the bore of the supply tube 69a between the cap 82 and the closed ball valve 88. The valve 87 is then closed and the valve 91 is opened to apply a vacuum to outgas the particulate glass. Once the outgassing has taken place the vacuum is removed and the valve 91 is closed and the valve 88 is opened to permit the outgassed glass to fall into the crucible 72. The induction coil 77 is then activated to heat the crucible 72 and the glass therein to form a flowable melt 166 therein. A positive pressure is then applied via the valved line 92 to supply sufficient pressure (e.g., 60 psi) to urge the glass melt through the annular opening 74 to form a glass tube 170.

If the tube 170 starts to bend upon leaving the annular opening 74 an operator can adjust the position of the X-Y motion apparatus 54 to move the crucible 72 laterally, within the coil 77, in a direction towards the bend until the tube straightens out (i.e., extruded on a substantially vertical axis). As can best be seen in FIGS. 3 and 4, the tube 68 with the crucible 72 attached thereto may be moved in the X-Y plane by moving plates 106 or 112 along the bearings and ways 108—108. The motion is transmitted by the top plate 114 to the end caps 118—118 and the tubular member 116. The crucible 72 will then move laterally within the insulator 79 and the coil 77 to the desired position. The plates 106 and 112 can either be moved manually using screw adjustment mechanisms (not shown) or automatically as is well known in the art.

Alternatively, automated non-contact techniques may be used to monitor any bend in the tube 170 as it exits the annular opening 74 in the crucible 72 and generate a control signal to adjust the X-Y motion apparatus 54 appropriately. One such monitoring apparatus is shown in U.S. Pat. No. b 3,876,877 which is incorporated herein by reference. That patent describes an automated adjusting procedure wherein a light filament is positioned accurately on a base member by directing orthogonal beams of light at the filament to form a shadow pattern thereof on two diode arrays. The information from the diode arrays is processed to provide a feedback signal to accurately align the filament on the base.

Additionally, after the completion of the extrusion of the tube 170, a solid glass residue tends to form on the bottom of the crucible 72 in or around the annular opening. A substantial portion of this residue can be removed by moving the crucible 72 upward while the coil 77 remains energized to increase the heat about the lower portion of the crucible and the residue glass therein to cause substantially all of the glass to flow through the annular opening 74. Such upward movement is accomplished by moving the cylinders 162—162 (see FIG. 2) vertically upward on the rods 154—154 which urges the plate 152 upward which in turn moves the pipe 68 and the attached crucible 64 upward.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of substantially eliminating the bend in a tube that is extruded from a glass melt in a crucible heated by heating means surrounding and spaced from said crucible, the method comprising the steps of:
    monitoring the bend of the extruded tube exiting the crucible; and
    moving the crucible relative to the heating means, in the direction of the bend, to straighten the tube within predetermined limits in response to said monitoring means.

2. A method for extruding a straight glass tube from a chamber having a heating coil mounted about a crucible containing a charge of solid glass wherein the heating coil is activated to heat at least a portion of the crucible and the charge therein to cause the glass to be flowable, while applying a gas pressure head to the melt to urge the melt through an annulus in the crucible to form the tube, wherein the tube tends to bend, the method comprising the steps of:
    monitoring the extruded tube exiting the annulus to determine the direction of the bend; and
    moving the crucible relative to the coil, in the direction of the bend, to straighten the tube in response to said monitoring means.

3. An apparatus for extruding a substantially straight tube from a glass melt, comprising:
    a crucible, adapted to contain a charge of glass, having an annular opening in the bottom portion thereof;
    heating means positioned about the crucible
    means for monitoring the bend of the extruded tube exiting the crucible; and
    means for moving the crucible laterally within the heating means in response to said monitoring means.

4. The apparatus as set forth in claim 3, wherein:
    said crucible is mounted in a means movable in a radial direction.

5. An apparatus for eliminating the bend in a tube that is extruded from a glass melt in a crucible heated by heating means surrounding and spaced from said crucible, the apparatus comprising:
    means for monitoring the bend of the extruded tube exiting the crucible; and
    means for moving the crucible relative to the coil, in the direction of the bend, to straighten the tube within predetermined limits in response to said monitoring means.

* * * * *

UNITED STATES PATENT AND TRADEMARK OFFICE
CERTIFICATE OF CORRECTION

PATENT NO. : 4,350,513
DATED : September 21, 1982
INVENTOR(S) : A. Coucoulas-C. D. Spainhour It is certified that error appears in the above-identified patent and that said Letters Patent are hereby corrected as shown below:

In the specification, Column 2, line 8, "Usually of" should read --Usually a--. Column 3, line 55, "bail" should read --ball--. Column 5, line 9, "U.S. Pat. No. b 3,876,877" should read --U.S. Patent 3,876,877--.

In the claims, Column 6, claim 1, line 4, "means" should read --step--; claim 2, line 18, "means" should read --step--;

Signed and Sealed this

Eighth Day of February 1983

[SEAL]

Attest:

Attesting Officer

GERALD J. MOSSINGHOFF
Commissioner of Patents and Trademarks